US012618524B2

(12) United States Patent
Motomochi et al.

(10) Patent No.: US 12,618,524 B2
(45) Date of Patent: May 5, 2026

(54) GAS DETECTION SYSTEM AND GAS DETECTION METHOD

(71) Applicant: Nuvoton Technology Corporation Japan, Kyoto (JP)

(72) Inventors: Kenji Motomochi, Osaka (JP); Shinichi Yoneda, Kyoto (JP); Satoru Ito, Hyogo (JP); Ken Kawai, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 52 days.

(21) Appl. No.: 18/780,002

(22) Filed: Jul. 22, 2024

(65) Prior Publication Data

US 2024/0377035 A1 Nov. 14, 2024

Related U.S. Application Data

(63) Continuation of application No. PCT/JP2023/000636, filed on Jan. 12, 2023.

(30) Foreign Application Priority Data

Jan. 31, 2022 (JP) ................................. 2022-013076

(51) Int. Cl.
*H01M 8/04746* (2016.01)
*F17C 13/02* (2006.01)
*H01M 8/04791* (2016.01)
(52) U.S. Cl.
CPC ......... *F17C 13/02* (2013.01); *H01M 8/04746* (2013.01); *H01M 8/04791* (2013.01); *F17C 2250/0408* (2013.01); *F17C 2250/0452* (2013.01); *F17C 2250/0636* (2013.01); *F17C 2270/0184* (2013.01)

(58) Field of Classification Search
CPC ......... H01M 8/04201; H01M 8/04089; H01M 8/0438
See application file for complete search history.

(56) References Cited

U.S. PATENT DOCUMENTS

2008/0319687 A1 12/2008 Kurosawa
2016/0315338 A1* 10/2016 Nada ................. H01M 8/04253
(Continued)

FOREIGN PATENT DOCUMENTS

JP        07-027586 A      1/1995
JP        2005-027476 A    1/2005
(Continued)

OTHER PUBLICATIONS

International Search Report dated Feb. 28, 2023 issued in International Patent Application No. PCT/JP2023/000636, with English machine translation.

(Continued)

*Primary Examiner* — Paul J Gray
(74) *Attorney, Agent, or Firm* — Rimon P.C.

(57) ABSTRACT

A gas detection system is for detecting the remaining amount of gas in a gas tank that stores a predetermined gas. The gas detection system includes: a gas detector that detects the predetermined gas; and a shutter (e.g., a pressure detector) that is connected between the gas tank and the gas detector and opens and closes a path of the predetermined gas from the gas tank to the gas detector.

12 Claims, 9 Drawing Sheets

(56)           References Cited

U.S. PATENT DOCUMENTS

| | | | |
|---|---|---|---|
| 2019/0173111 A1* | 6/2019 | Yamanaka ........ | H01M 8/04753 |
| 2020/0232603 A1* | 7/2020 | Kawase ............ | H01M 8/04753 |
| 2021/0218042 A1* | 7/2021 | Tsukamoto ....... | H01M 8/04089 |
| 2021/0257635 A1* | 8/2021 | Namba ............. | H01M 8/04302 |
| 2021/0317951 A1* | 10/2021 | Werlen ................... | F17C 5/007 |

FOREIGN PATENT DOCUMENTS

| | | |
|---|---|---|
| JP | 2005-240854 A | 9/2005 |
| JP | 2009-002432 A | 1/2006 |
| JP | 2017-173149 A | 9/2017 |
| JP | 2020-118174 A | 8/2020 |

OTHER PUBLICATIONS

Yutaka Suzuki, "New Product Introduction—KGPR65D High-pressure Hydrogen Regulator for Fuel Cell Vehicles", Kawasaki Technical Review No. 181, pp. 38-39, Nov. 2019 with its English translation.

* cited by examiner

GAS DETECTION SYSTEM AND GAS DETECTION METHOD

CROSS REFERENCE TO RELATED APPLICATIONS

This is a continuation application of PCT International Application No. PCT/JP2023/000636 filed on Jan. 12, 2023, designating the United States of America, which is based on and claims priority of Japanese Patent Application No. 2022-013076 filed on Jan. 31, 2022. The entire disclosures of the above-identified applications, including the specifications, drawings and claims are incorporated herein by reference in their entirety.

FIELD

The present disclosure relates to a gas detection system and a gas detection method.

BACKGROUND

Recent years have seen efforts made to expand the spread of hydrogen-fueled mobility entities such as fuel cell vehicles (FCVs), fuel cell bicycles, and fuel cell drones. In order to eliminate concerns about running out of hydrogen fuel, such mobility entities are required to detect the remaining amount of hydrogen. Patent Literature (PTL) 1 discloses a technique for measuring the remaining amount of gaseous fuel (e.g., compressed gas fuel) such as hydrogen using a pressure sensor.

CITATION LIST

Patent Literature

PTL 1: Japanese Unexamined Patent Application Publication No. 2005-240854

SUMMARY

Technical Problem

With the technique disclosed by PTL 1, however, the remaining amount of gas may not be accurately detected when the remaining amount of gas is low.

In view of this, the present disclosure provides a gas detection system and a gas detection method for detecting the remaining amount of gas more accurately than the conventional technique.

Solution to Problem

A gas detection system according to an aspect of the present disclosure is a gas detection system for detecting a remaining amount of gas in a gas tank that stores a predetermined gas, the gas detection system including: a gas detector that detects the predetermined gas; and a shutter that is connected between the gas tank and the gas detector and opens and closes a path of the predetermined gas from the gas tank to the gas detector.

A gas detection method according to an aspect of the present disclosure is a gas detection method to be performed by a gas detection system for detecting a remaining amount of gas in a gas tank that stores a predetermined gas, wherein the gas detection system includes: a gas detector that detects whether or not the predetermined gas is present; and a shutter that is connected between the gas tank and the gas detector and includes an open-close valve that opens and closes a path of the predetermined gas from the gas tank to the gas detector, the gas detection method including: causing the open-close valve to open naturally when a pressure of the predetermined gas is less than or equal to a predetermined pressure; and detecting, by the gas detector, the predetermined gas from the shutter when the open-close valve is open.

A gas detection method according to an aspect of the present disclosure is a gas detection method to be performed by a gas detection system for detecting a remaining amount of gas in a gas tank that stores a predetermined gas, wherein the gas detection system includes: a gas detector that detects a concentration of the predetermined gas; and a shutter that is connected between the gas tank and the gas detector and includes an open-close valve that opens and closes a path of the predetermined gas from the gas tank to the gas detector, the gas detection method including: opening and closing the path at predetermined time intervals using the open-close valve; and detecting, by the gas detector, a concentration of the predetermined gas from the shutter when the open-close valve is open.

Advantageous Effects

According to an aspect of the present disclosure, it is possible to implement a gas detection system and the like capable of detecting the remaining amount of gas more accurately than the conventional technique.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a partial cross-sectional view schematically illustrating a configuration of a gas detection system according to Embodiment 1.

FIG. 6 is a diagram schematically illustrating a configuration of a gas detection system according to Embodiment 2.

Figure 2:
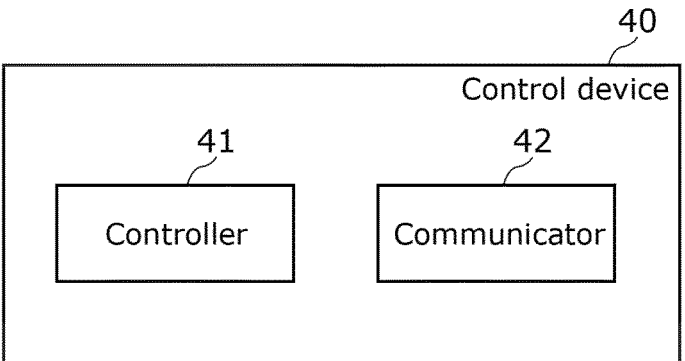
FIG. 2 is a block diagram illustrating a functional configuration of a control device according to Embodiment 1.

DESCRIPTION OF EMBODIMENTS (Circumstances Leading to the Present Disclosure)

Prior to describing the present disclosure, the circumstances leading to the present disclosure will be described.

As described in the "Background" and "Technical Problem" sections above, PTL 1 discloses the technique of calculating the remaining amount of gas such as gaseous fuel using a pressure sensor (a manometer). Pressure sensors, however, may not be capable of accurate detection (measurement) when the remaining amount of gas is less than or equal to a certain value. That is to say, with the conventional technique, the remaining amount of gas detected is unreliable.

In view of the above, the inventors of the present application have conducted intensive studies on a gas detection system and a gas detection method capable of detecting the remaining amount of gas more accurately than the conventional technique, and have devised the gas detection system and the gas detection method described below.

Hereinafter, exemplary embodiments will be specifically described with reference to the drawings. Note that the embodiments described below each show a general or specific example. The numerical values, shapes, constituent elements, the arrangement and connection of the constituent elements, steps, the processing order of the steps etc. illustrated in the embodiments described below are mere examples, and are not intended to limit the present disclosure. Among the constituent elements in the embodiments described below, constituent elements not recited in the independent claims will be described as optional constituent elements.

The drawings are represented schematically and are not necessarily precise illustrations. Therefore, the scales, for example, are not necessarily consistent from drawing to drawing. In the drawings, essentially the same constituent elements share the same reference signs, and redundant descriptions will be omitted or simplified.

In the present specification, the term "up-down" does not refer to the upward (vertical up) direction and the downward (vertical down) direction in absolute spatial perception, but is used as a term defined by the direction of movement of the open-close valve in the shutter.

In addition, in the present specification, terms that indicate relationships between elements such as "parallel" and "the same", terms that indicate the shapes of elements such as "truncated-cone-shaped", numerical values, and numerical ranges do not express their strict meanings only, but also include substantially equivalent ranges, e.g., differences of several percent (or about 10%).

Embodiment 1

Figure 1:
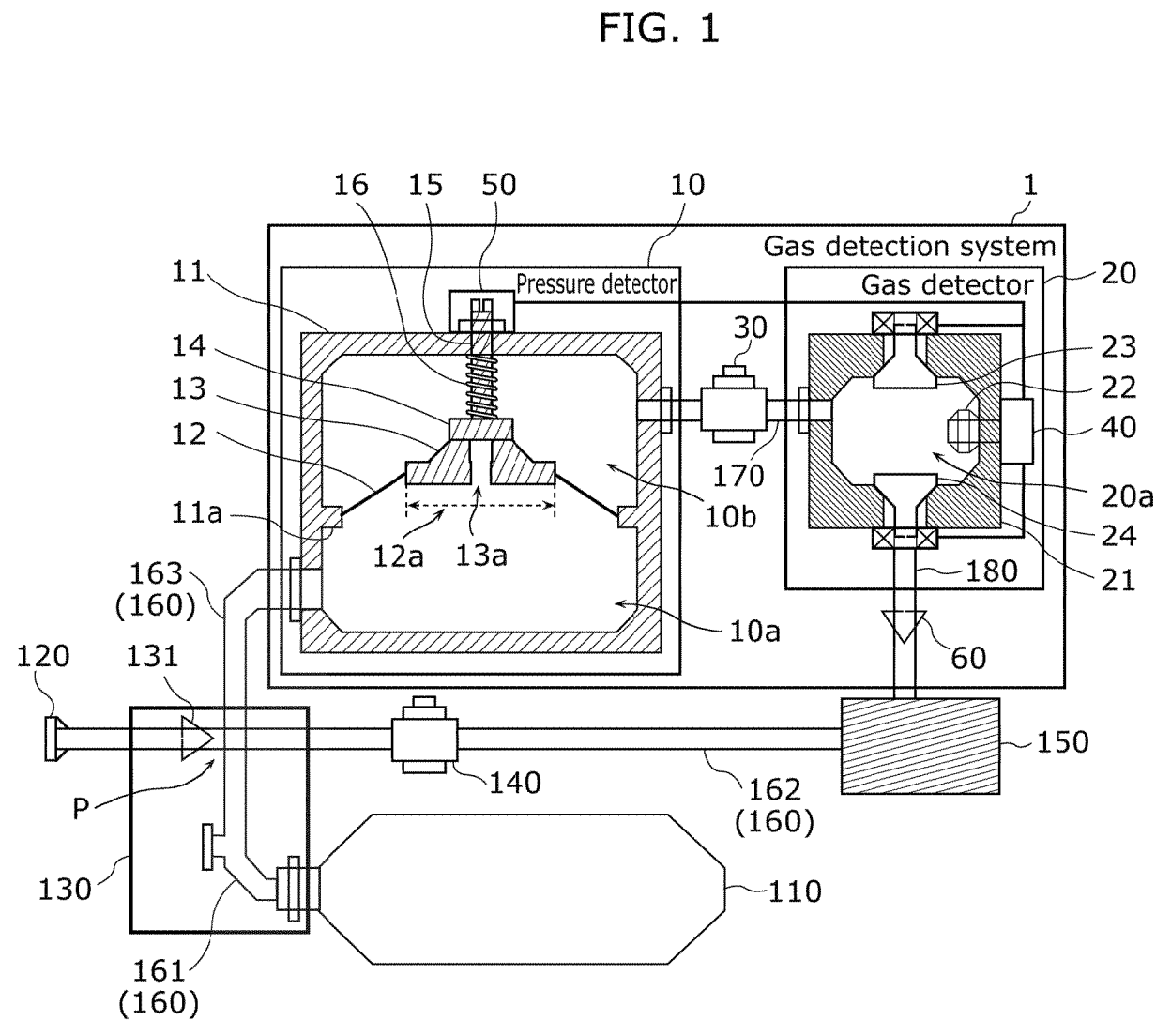

Hereinafter, a gas detection system according to the present embodiment will be described with reference to FIG. 1 through FIG. 5.

[1-1. Configuration of Gas Detection System]

First, a configuration of the gas detection system according to the present embodiment will be described with reference to FIG. 1 and FIG. 2. FIG. 1 is a partial cross-sectional view schematically illustrating a configuration of gas detection system 1 according to the present embodiment. FIG. 1 illustrates a schematic cross-sectional view of pressure detector 10 in a state in which the path (flow path) of hydrogen from gas tank 110 to gas detector 20 is blocked. Note that FIG. 1 illustrates a cross-sectional view of housings 11 and 21, pressure detection valve 13, and lid 14.

As illustrated in FIG. 1, gas detection system 1 includes pressure detector 10, gas detector 20, depressurization valve 30, control device 40, adjustment device 50, and check valve 60. Gas detection system 1 is a gas detection system provided to a hydrogen-fueled mobility entity such as a fuel cell vehicle (FCV), a fuel cell bicycle, or a fuel cell drone, for detecting the remaining amount of hydrogen in the mobility entity. The following describes an example in which gas detection system 1 is provided to a fuel cell vehicle (see FIG. 9 described later). In addition to gas detection system 1, the fuel cell vehicle includes gas tank 110, gas inlet 120, gas tank valve 130, depressurization valve 140, and fuel cell (fuel cell stack) 150.

Pressure detector 10, which is an example of the shutter, is connected between gas tank 110 and gas detector 20 and includes pressure detection valve 13 that opens and closes the path of hydrogen from gas tank 110 to gas detector 20. Pressure detector 10 has a structure in which pressure detection valve 13 opens and closes according to the pressure inside gas tank 110 (the internal pressure). In the present embodiment, the internal pressure refers to the pressure of hydrogen. Note that the path in the present embodiment is formed by first piping portion 161, third piping portion 163, first internal space 10a, communication hole 13a, second internal space 10b, and piping 170.

Pressure detector 10 includes housing 11, partition film 12, pressure detection valve 13, lid 14, rod 15, and spring 16.

Housing 11 is a case that houses therein partition film 12, pressure detection valve 13, lid 14, rod 15, and spring 16. Housing 11 is sealed in a state in which third piping portion 163 forming a part of the path of hydrogen from gas tank 110 is connected with piping 170 connecting pressure detector 10 and gas detector 20. Housing 11 allows the pressure of hydrogen to act on partition film 12. To allow the pressure of hydrogen to act on partition film 12 is to deform (e.g., elastically deform) partition film 12 using the pressure of hydrogen.

Note that, in the present specification, the expression "element A and element B are connected" means that element A and element B are connected via piping (e.g., a pipe or a tube) and hydrogen is movable between element A and element B via the piping.

Housing 11 includes therein fixing portion 11a at which one end of partition film 12 is fixed. Fixing portion 11a is formed perimetrically, for example. Fixing portion 11a is, for example, a protrusion protruding from the inner surface of housing 11 toward the center of the internal space of housing 11, but is not limited to this.

Housing 11 is formed using a material that can withstand the pressure of hydrogen. Housing 11 is formed using metal, for example, but is not limited to this.

Partition film 12 is a diaphragm whose periphery is fixed to fixing portion 11a and deforms (e.g., elastically deforms) according to the action of the pressure of hydrogen. Partition film 12 is a frame-shaped film that blocks a path of hydrogen between third piping portion 163 and piping 170 in the path of hydrogen from gas tank 110 to gas detector 20, and includes opening 12a in which pressure detection valve 13 is provided. Partition film 12 separates first internal space 10a and second internal space 10b in housing 11 in a state in which communication hole 13a is closed by lid 14 as illustrated in FIG. 1. Partition film 12, when viewed in the up-down direction, covers the space between fixing portion 11a and pressure detection valve 13. The up-down direction is, for example, the direction parallel to the direction in which pressure detection valve 13 moves due to deformation of partition film 12, and is the direction parallel to the up-down direction of the drawing in the example illustrated in FIG. 1. In the present embodiment, the up-down direction is also the direction parallel to the extending direction of rod 15.

As an example, partition film 12 is a circular thin sheet of stainless steel or the like that bends when pressure is applied from one surface. The elastic deformation of partition film 12 due to the pressure of hydrogen causes pressure detection valve 13 to move in the up-down direction. For example, a decrease in the pressure of hydrogen causes pressure detection valve 13 to move downward (in the direction away from lid 14), and an increase in the pressure of hydrogen causes pressure detection valve 13 to move upward (in the direction toward lid 14). Note that partition film 12 may be formed using a material other than stainless steel, so long as it is a plate-shaped member that withstands the pressure of hydrogen and bends when the pressure of hydrogen is applied.

Note that, of the internal space of housing 11 separated by partition film 12 and pressure detection valve 13, first internal space 10a is an internal space connected with gas tank 110 via piping 160 (third piping portion 163), and is the internal space located below second internal space 10b in the example illustrated in FIG. 1. Hydrogen in gas tank 110 flows into first internal space 10a via piping 160. That is to say, the pressure of hydrogen in first internal space 10a is the same as the pressure of hydrogen in gas tank 110. The volume of first internal space 10a is in accordance with the pressure of hydrogen. When the remaining amount of hydrogen in gas tank 110 becomes low due to hydrogen consumption and the pressure of hydrogen in gas tank 110 drops, the pressure of hydrogen in first internal space 10a drops as well.

Of the internal space of housing 11 separated by partition film 12 and pressure detection valve 13, second internal space 10b is an internal space connected with gas detector 20 via piping 170, and is the internal space located above first internal space 10a in the example illustrated in FIG. 1.

Pressure detection valve 13, which is an example of the open-close valve, is fixed to the other end of partition film 12 and moves in the up-down direction in response to elastic deformation of partition film 12. Communication hole 13a passing through in the up-down direction is provided in pressure detection valve 13. Communication hole 13a is a through-hole for allowing communication between first internal space 10a and second internal space 10b in housing 11, and allows communication between first internal space 10a and second internal space 10b when communication hole 13a is not closed by lid 14. In other words, communication hole 13a, when not closed by lid 14, forms a path of hydrogen flowing from first internal space 10a into second internal space 10b.

Pressure detection valve 13 is formed using a material that does not become deformed by, for example, the pressure of hydrogen. Pressure detection valve 13 is formed using metal or resin, but is not limited to this.

Lid 14 is a valve element provided for closing the path of hydrogen to gas detector 20, and closes (blocks) the path of hydrogen between gas tank 110 and gas detector 20 by closing communication hole 13a. Lid 14 is disposed in second internal space 10b and closes communication hole 13a from an end of communication hole 13a closer to gas detector 20 than to gas tank 110. So long as lid 14 can close the hydrogen path by closing communication hole 13a, the size, shape, and material of lid 14 are not particularly limited. The position of lid 14 is fixed by adjustment device 50. That is to say, lid 14 is kept at a certain position regardless of the pressure of hydrogen in gas tank 110. Lid 14 is fixed to an end of rod 15 closer to pressure detection valve 13. Lid 14 and rod 15 may be integrally formed, for example.

Rod 15 is connected with lid 14 and adjustment device 50 and is movable in the up-down direction to adjust the position of lid 14. The length of rod 15 is determined in advance according to the desired remaining amount of hydrogen to be detected. In the present embodiment, rod 15 is formed using metal or resin, for example, but the material is not particularly limited.

Spring 16 is a compression spring formed in a spiral shape and has rod 15 inserted therein.

Gas detector 20 includes detection element 22 that detects hydrogen. In the present embodiment, gas detector 20 detects whether or not hydrogen is present. Gas detector 20 detects whether the gas from pressure detector 10 contains hydrogen. Gas detector 20 detects hydrogen from pressure detector 10 leaking through a gap created between pressure detection valve 13 and lid 14 when the pressure of hydrogen drops.

Gas detector 20 includes housing 21, detection element 22, first release valve 23, and second release valve 24.

Housing 21 is a case that is connected with pressure detector 10 via piping 170, and houses detection element 22 therein. Housing 21 is sealed in a state in which piping 170 and 180 are connected and first release valve 23 and second release valve 24 are closed.

Housing 21 is formed using a material that can withstand the pressure of hydrogen. Housing 21 is formed using metal, for example, but is not limited to this.

Detection element 22, which is an example of the gas sensor, detects hydrogen (an example of the predetermined gas) in internal space 20a. In the present embodiment, detection element 22 detects hydrogen. Detection element 22 is exemplified by a semiconductor detection element, for example. The semiconductor detection element detects the presence of hydrogen through a change in conductivity of a semiconductor element, and is exemplified by a hydrogen sensor disclosed in Japanese Patent Application No. 2020-73461, for example. Note that detection element 22 is not limited to a semiconductor detection element and may be any existing element.

First release valve 23 and second release valve 24 are one or more release valves for releasing hydrogen from pressure detector 10 to the outside of gas detector 20. First release valve 23 and second release valve 24 open and close according to the control by control device 40.

First release valve 23 is a release valve for opening and closing the path between internal space 20a and the external space. First release valve 23 may be closed at normal times and opened according to the control by control device 40 when detection element 22 detects hydrogen.

Second release valve 24 is a release valve for opening and closing the path between internal space 20a and piping 180 that connects gas detector 20 and fuel cell 150. Second release valve 24 may be closed at normal times and opened according to the control by control device 40 when detection element 22 detects hydrogen.

Depressurization valve 30 is a regulator that is disposed in the path between pressure detector 10 and gas detector 20 (e.g., on piping 170) and regulates the pressure of hydrogen flowing from pressure detector 10 to gas detector 20 (i.e., from gas tank 110 to gas detector 20). The pressure of hydrogen in gas tank 110 (the internal pressure) is high and exceeds 80 Mpa in some cases, for example. If such high-pressure hydrogen flows into internal space 20a without being depressurized, the pressure may break detection element 22.

In view of this, in the present embodiment, hydrogen is depressurized via depressurization valve 30 before flowing into gas detector 20. It suffices so long as depressurization valve 30 depressurizes hydrogen to an extent that detection element 22 would not be broken. Depressurization valve 30 may depressurize hydrogen to about atmospheric pressure (0.1 Mpa), for example. Depressurization valve 30 may depressurize hydrogen to about the same pressure as hydrogen depressurized by depressurization valve 140. Note that depressurization valve 30 need not be provided if detection element 22 is strong enough to withstand high-pressure hydrogen that flows in.

Control device 40 controls each constituent element of gas detection system 1. FIG. 2 is a block diagram illustrating a functional configuration of control device 40 according to the present embodiment.

As illustrated in FIG. 2, control device 40 includes controller 41 and communicator 42. That is to say, control device 40 has a communication function (e.g., a wireless communication function).

Controller 41 controls each constituent element based on, for example, a hydrogen detection result of detection element 22. Controller 41, for example, controls the position of lid 14 by outputting, to adjustment device 50, a gas detection signal indicating that detection element 22 has detected hydrogen. Also, controller 41 opens at least one of first release valve 23 or second release valve 24 when detection element 22 detects hydrogen. Controller 41 opens at least one of first release valve 23 or second release valve 24 after detection element 22 detects hydrogen and communication hole 13a is closed as a result of adjustment device 50 moving lid 14 in response to the gas detection signal. It suffices so long as controller 41 opens at least second release valve 24 when detection element 22 detects hydrogen, for example.

Communicator 42, which is an example of the wireless communicator, is a communication circuit (a communication module) for communicating (wirelessly communicating) with a device outside the fuel cell vehicle to which gas detection system 1 is provided. For example, when detection element 22 detects hydrogen, communicator 42 may transmit information indicating that hydrogen has been detected to a mobile terminal (e.g., a smartphone) of a user who rides in the fuel cell vehicle or a monitoring person who remotely monitors the fuel cell vehicle. Note that the wireless communication is performed using, for example, radio wave communication, but the method for the wireless communication is not limited to this and may be performed using any communication method. Communicator 42 may be a communicator different from a communicator provided to the fuel cell vehicle in advance. That is to say, communicator 42 may be a dedicated communicator for gas detection system 1 or may be included in the communicator provided to the fuel cell vehicle in advance. Note that being included in the communicator provided to the fuel cell vehicle in advance means that the communicator provided to the fuel cell vehicle in advance has the function of communicator 42.

Referring again to FIG. 1, adjustment device 50, which is an example of the adjuster, adjusts the position of lid 14 to close communication hole 13a based on the gas detection signal (a hydrogen detection signal in the present embodiment) from control device 40. Specifically, adjustment device 50 is connected with rod 15 and adjusts the position of lid 14 by, for example, moving rod 15 in the up-down direction. Adjustment device 50 may have a configuration for moving rod 15 in the up-down direction using a motor or the like, or may have a configuration for moving rod 15 in the up-down direction using electromagnetic force. Adjustment device 50 may include, for example, a coil, a yoke, and a fixed iron core, and rod 15 may function as a movable iron core.

Adjustment device 50 gradually adjusts the position of lid 14 in stages. Adjustment device 50 may move rod 15 downward by a predetermined distance every time the gas detection signal is obtained.

Check valve 60 is a check valve disposed between gas detector 20 and fuel cell 150 to prevent backflow of hydrogen from fuel cell 150 to gas detector 20. Check valve 60 is provided on piping 180 that connects gas detector 20 and fuel cell 150.

As described above, gas detection system 1 does not calculate the remaining amount of hydrogen using the pressure of hydrogen, but is capable of directly detecting hydrogen using detection element 22 that detects hydrogen and calculating the remaining amount of hydrogen using the detection result.

Note that gas detection system 1 may be a battery-operable system. For example, gas detection system 1 may have a built-in battery (not illustrated) or may be powered by a battery provided to the fuel cell vehicle. Note that a dedicated power supply that enables gas detection system 1 to operate may be provided to the fuel cell vehicle.

Gas tank 110 is a fuel tank that stores, as the predetermined gas, pressurized fuel to be used for the fuel cell vehicle to which gas tank 110 is provided. In the present embodiment, gas tank 110 is a hydrogen tank that stores hydrogen (hydrogen gas). Gas tank 110 can store hydrogen having a pressure of about 80 Mpa, for example. Gas tank 110 is formed using metal, for example, but is not limited to this.

Note that the predetermined gas is not limited to hydrogen, and a gaseous fuel (e.g., compressed gaseous fuel) such as natural gas or liquefied petroleum gas used as fuel for mobility entities, or a flammable gas other than hydrogen may be stored. In other words, gas detection system 1 may be a system that detects the remaining amount of gas other than hydrogen. Note that a gaseous fuel is a fuel that is a gas at normal temperature and normal pressure.

Gas tank 110 is connected with gas detection system 1 (specifically, pressure detector 10) and fuel cell 150 via gas tank valve 130.

Gas inlet 120 is an inlet for filling gas tank 110 with a gas (hydrogen in the present embodiment) from hydrogen supply equipment that is provided outside (not illustrated). Hydrogen is supplied when a dedicated instrument (e.g., a filling plug) is inserted into gas inlet 120. When hydrogen is supplied through gas inlet 120, gas tank 110 is filled with hydrogen via gas tank valve 130.

Gas tank valve 130 is a valve that controls the flow of the gas (hydrogen in the present embodiment) into and out of gas tank 110. Gas tank valve 130 is connected with gas tank 110 and gas detection system 1. Gas tank valve 130 is also connected with fuel cell 150 via piping 160 (second piping portion 162).

Gas tank valve 130 includes check valve 131. Check valve 131 is a check valve disposed between piping 160 branched in three directions and gas inlet 120 to prevent backflow of hydrogen from gas detection system 1, gas tank 110, and fuel cell 150 to gas inlet 120.

Depressurization valve 140 is a regulator that is disposed in a path between gas tank 110 and fuel cell 150 (e.g., on second piping portion 162) and regulates the pressure of hydrogen flowing from gas tank 110 to fuel cell 150. Depressurization valve 140 may depressurize hydrogen to about atmospheric pressure, for example. Note that a pressure regulation valve may be disposed between depressurization valve 140 and fuel cell 150 to further regulate the pressure.

Fuel cell 150 generates electricity using a chemical reaction between hydrogen supplied to gas tank 110 and oxygen in the air. The electricity generated by fuel cell 150 is used to drive a motor for running, so that the fuel cell vehicle runs.

Note that FIG. 1 omits illustration of, for example, an air supplier that supplies air to fuel cell 150 and an exhauster that exhausts a gas emitted from fuel cell 150.

Piping 160 is piping that connects gas tank 110 and fuel cell 150 and connects gas tank 110 and pressure detector 10. Piping 160 includes first piping portion 161 extending from branch point P to gas tank 110, second piping portion 162 extending from branch point P to fuel cell 150, and third piping portion 163 extending from branch point P to pressure detector 10. Hydrogen is supplied from gas tank 110 to fuel cell 150 via first piping portion 161 and second piping portion 162. Hydrogen flows from gas tank 110 to pressure detector 10 via first piping portion 161 and third piping portion 163.

Piping 170 is piping that connects pressure detector 10 and gas detector 20.

Piping 180 is piping that connects gas detector 20 and fuel cell 150.

Piping 160, 170, and 180 are configured with pipes or tubes.

[1-2. Operation of Gas Detection System]

Figure 3:
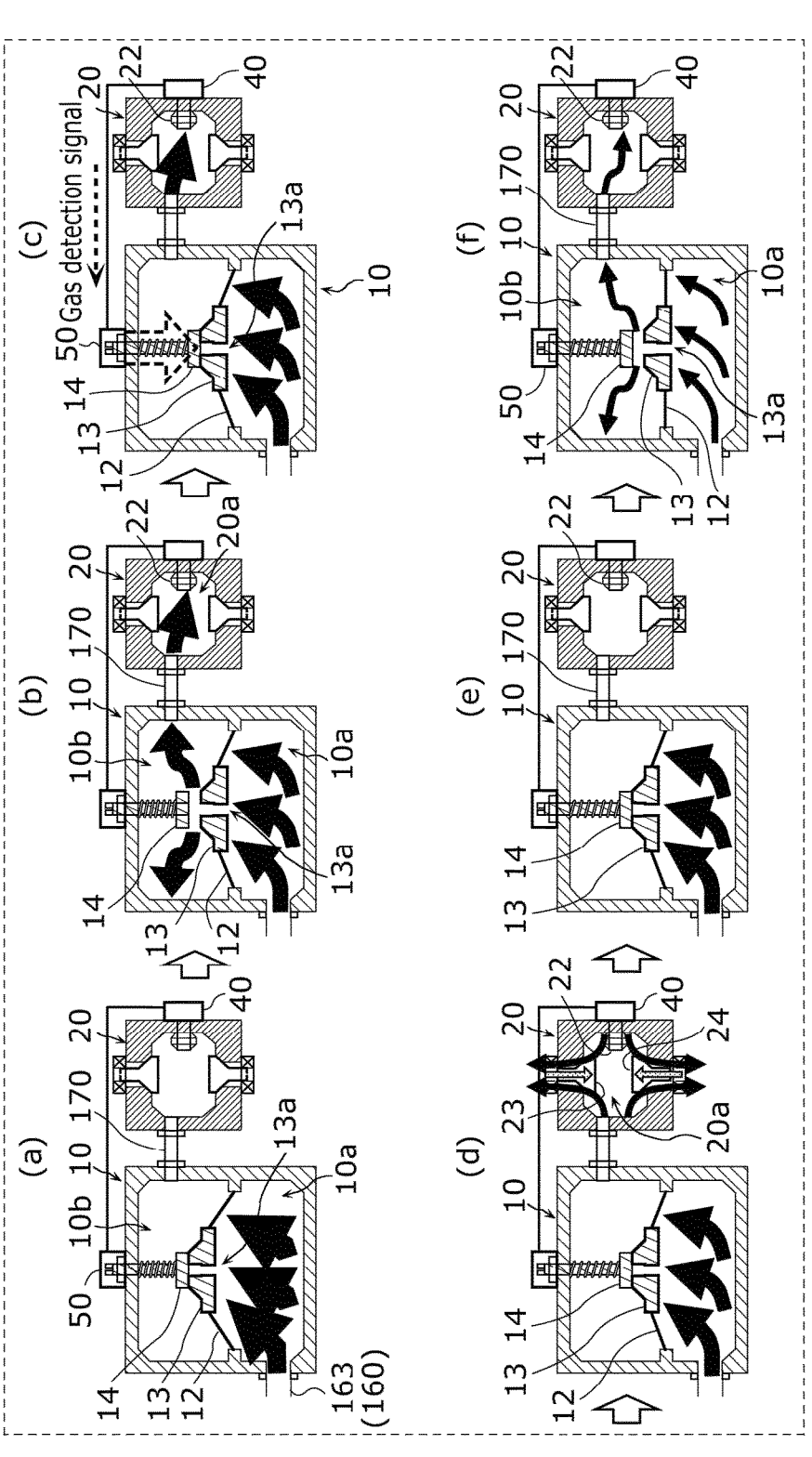
FIG. 3 is a diagram schematically illustrating operation of the gas detection system according to Embodiment 1.

Next, operation of gas detection system 1 (physical movement of the constituent elements) will be described with reference to FIG. 3. FIG. 3 is a diagram schematically illustrating operation of gas detection system 1 according to the present embodiment. The arrows in FIG. 3 show the inflow paths of hydrogen. The thickness of the arrows represents the pressure of hydrogen; the thicker the arrow, the higher the pressure of hydrogen. Note that FIG. 3 only illustrates constituent elements used for describing operation of gas detection system 1, and omits illustration of some constituent elements (e.g., depressurization valve 30).

Part (a) of FIG. 3 illustrates gas detection system 1 when there is a sufficient amount of hydrogen remaining in gas tank 110 and the internal pressure of gas tank 110 is high. In this case, the pressure of hydrogen causes elastic deformation of partition film 12, thereby pushing pressure detection valve 13 up toward lid 14 (upward) and causing pressure detection valve 13 to contact lid 14. As a result, communication hole 13*a* of pressure detection valve 13 is closed by lid 14, and thus hydrogen in first internal space 10*a* cannot flow into second internal space 10*b*. Part (a) of FIG. 3 illustrates a state in which pressure detection valve 13 is closed.

In the state illustrated in part (a) of FIG. 3, hydrogen does not flow into gas detector 20, and therefore, detection element 22 does not detect hydrogen.

Part (b) of FIG. 3 illustrates gas detection system 1 when the remaining amount of hydrogen in gas tank 110 decreases from the amount of hydrogen in the state illustrated in part (a) of FIG. 3 and the internal pressure of gas tank 110 is less than or equal to a first pressure. In this case, the drop in the pressure of hydrogen reduces the elastic deformation of partition film 12 (e.g., partition film 12 loosens), thereby pushing pressure detection valve 13 down away from lid 14

(downward) and separating pressure detection valve 13 from lid 14. As a result, communication hole 13*a* of pressure detection valve 13 is not closed by lid 14, and thus hydrogen in first internal space 10*a* can flow into second internal space 10*b*. Part (b) of FIG. 3 illustrates a state in which pressure detection valve 13 is open. It can be said that pressure detection valve 13 is a valve that opens when the pressure of hydrogen is less than or equal to the first pressure. Pressure detection valve 13 automatically transitions from the closed state to the open state in response to a drop in the pressure of hydrogen. It can be said that pressure detection valve 13 transitions from the closed state to the open state based on the remaining amount of hydrogen in gas tank 110 (i.e., the pressure of hydrogen). Pressure detection valve 13 automatically transitioning from the closed state to the open state means that pressure detection valve 13 opens spontaneously without any force other than the pressure of hydrogen.

In the state illustrated in part (b) of FIG. 3, hydrogen flows into gas detector 20 via second internal space 10*b* and piping 170, and therefore, detection element 22 detects hydrogen.

Note that the first pressure is set in advance and is stored in storage (not illustrated) of gas detection system 1. The first pressure is a pressure corresponding to the desired remaining amount of hydrogen to be detected by gas detection system 1. For example, in the case where the state illustrated in part (a) of FIG. 3 is a full fill and gas detection system 1 is to detect a remaining amount of hydrogen which is ½ of the full fill, the first pressure is a pressure corresponding to the remaining amount of hydrogen which is ½ of the full fill. Such a pressure can be obtained in advance through experimentation, for example.

Note that the position of lid 14 in part (a) of FIG. 3 and the position of lid 14 in part (b) of FIG. 3 are the same.

Part (c) of FIG. 3 illustrates how pressure detection valve 13 is closed after hydrogen is detected in the state illustrated in part (b) of FIG. 3. When detection element 22 detects hydrogen, control device 40 outputs, to adjustment device 50, the gas detection signal indicating that hydrogen is detected. Upon obtaining the gas detection signal from control device 40, adjustment device 50 adjusts the position of lid 14 to close pressure detection valve 13. Adjustment device 50 moves lid 14 toward pressure detection valve 13 (downward) to close communication hole 13*a*. For example, lid 14 is moved toward pressure detection valve 13 to a position where pressure detection valve 13 will open when the pressure of hydrogen is less than or equal to a second pressure that is a pressure corresponding to a remaining amount of hydrogen that is ¼ of the full fill.

Upon obtaining the gas detection signal, adjustment device 50 moves rod 15 toward pressure detection valve 13 to move lid 14 by a predetermined distance toward pressure detection valve 13. The predetermined distance is set in advance according to the pressure corresponding to the desired remaining amount of hydrogen to be detected by gas detection system 1.

In such a manner as described, in gas detection system 1, pressure detection valve 13 opens in response to a drop in the pressure of hydrogen, and adjustment device 50 controls the position of lid 14 so that pressure detection valve 13 closes again.

Part (d) of FIG. 3 illustrates how hydrogen accumulated inside gas detector 20 (internal space 20*a*) is released (discharged) to the outside of gas detector 20 in the state illustrated in part (c) of FIG. 3 in which pressure detection valve 13 is closed.

Control device 40 releases the hydrogen in gas detector 20 by opening at least one of first release valve 23 or second release valve 24 after the position of lid 14 is adjusted by adjustment device 50. Part (d) of FIG. 3 illustrates an example in which controller 40 opens both first release valve 23 and second release valve 24. Opening second release valve 24 connected to fuel cell 150 makes it possible to feed into fuel cell 150 hydrogen that has been detected. Note that the pressure in fuel cell 150 is lower than the pressure in internal space 20*a*. When the pressure in the external space outside gas detection system 1 is higher than the pressure in internal space 20*a*, first release valve 23 may also be opened. This allows hydrogen in internal space 20*a* to be effectively fed into fuel cell 150.

Controller 40 may open at least one of first release valve 23 or second release valve 24 in a state in which pressure detection valve 13 is closed. Whether or not pressure detection valve 13 is closed may be determined by, for example, adjustment device 50 detecting a change in the pressure received by lid 14 when lid 14 contacts pressure detection valve 13. Also, it may be determined that pressure detection valve 13 is closed based on the fact that, for example, detection element 22 no longer detects hydrogen after a lapse of a predetermined time period since at least one of first release valve 23 or second release valve 24 was opened.

Part (e) of FIG. 3 illustrates gas detection system 1 when the remaining amount of hydrogen in gas tank 110 decreases from the amount of hydrogen in the state illustrated in part (d) of FIG. 3 and the internal pressure of gas tank 110 is less than the first pressure and greater than or equal to the second pressure. In this case, pressure detection valve 13 pushes lid 14 up, and pressure detection valve 13 and lid 14 are in contact. Part (e) of FIG. 3 illustrates a state in which pressure detection valve 13 is closed.

In the state illustrated in part (e) of FIG. 3, hydrogen does not flow into gas detector 20, and therefore, detection element 22 does not detect hydrogen.

Part (f) of FIG. 3 illustrates gas detection system 1 when the remaining amount of hydrogen in gas tank 110 further decreases from the amount of hydrogen in the state illustrated in part (e) of FIG. 3 and the internal pressure of gas tank 110 is less than or equal to the second pressure. In this case, the drop in the pressure of hydrogen reduces the elastic deformation of partition film 12, thereby pushing pressure detection valve 13 down away from lid 14 (downward) and separating pressure detection valve 13 from lid 14. As a result, communication hole 13*a* of pressure detection valve 13 is not closed by lid 14, and thus hydrogen in first internal space 10*a* can flow into second internal space 10*b*. Part (f) of FIG. 3 illustrates a state in which pressure detection valve 13 is open. It can be said that pressure detection valve 13 is a valve that opens when the pressure of hydrogen is less than or equal to the second pressure.

In the state illustrated in part (f) of FIG. 3, hydrogen flows into gas detector 20 via second internal space 10*b* and piping 170, and therefore, detection element 22 detects hydrogen. When detection element 22 detects hydrogen again, control device 40 outputs, to adjustment device 50, the gas detection signal indicating that hydrogen is detected. Upon obtaining the gas detection signal from control device 40, adjustment device 50 adjusts the position of lid 14 again to close pressure detection valve 13.

As described above, gas detection system 1 is capable of detecting a desired remaining amount of gas (e.g., a plurality of discrete remaining amounts of gas) by repeating the cycle of closing pressure detection valve 13, then opening pressure detection valve 13 in response to a drop in the pressure of hydrogen in gas tank 110, and closing pressure detection valve 13 by adjustment device 50.

Note that the present disclosure is not limited to repeating the cycle illustrated in FIG. 3; it may be just one cycle of pressure detection valve 13 changing from the closed state to the open state. That is to say, gas detection system 1 may have a configuration that does not include adjustment device 50 and in which lid 14 does not move but is fixed at a predetermined position.

[1-3. Operation of Control Device]

Figure 4:
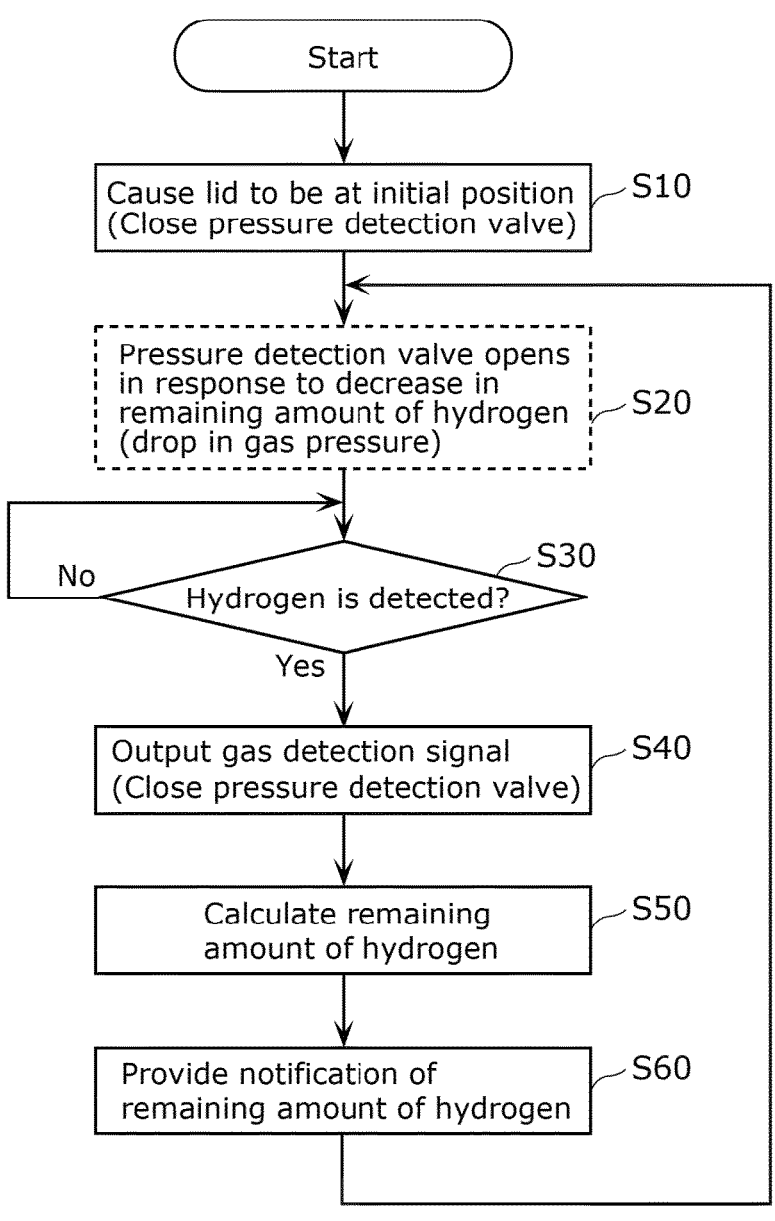
FIG. 4 is a flowchart illustrating an example of operation of the control device according to Embodiment 1.

Next, operation of control device 40 will be described with reference to FIG. 4 and FIG. 5. FIG. 4 is a flowchart illustrating operation of control device 40 (a gas detection method) according to the present embodiment. Note that the step not performed by control device 40 is shown in a dashed frame.

As illustrated in FIG. 4, controller 41 of control device 40 causes lid 14 to be at its initial position (S10). For example, controller 41 outputs, to adjustment device 50, a control signal for moving lid 14 to its initial position, and lid 14 is thereby moved to its initial position. As a result of step S10, pressure detection valve 13 is closed. Pressure detection valve 13 is put into the state illustrated in part (a) of FIG. 3, for example. Note that start of detection of whether or not hydrogen is present by detection element 22 may be triggered by the movement of lid 14 to its initial position.

Next, when the remaining amount of hydrogen decreases, pressure detection valve 13 opens in response to the decrease in the remaining amount of hydrogen (a drop in the gas pressure) (S20). In step S20, pressure detection valve 13 transitions from the closed state to the open state.

Next, controller 41 determines whether detection element 22 has detected hydrogen (S30). Controller 41 performs the determination in step S30 based on the detection result of detection element 22. In the case where detection element 22 has detected hydrogen (Yes in S30), controller 41 outputs a gas detection signal to adjustment device 50 (S40). Accordingly, controller 41 closes pressure detection valve 13, that is, controller 41 causes pressure detection valve 13 to transition from the open state to the closed state. In the case where detection element 22 has not detected hydrogen (No in S30), controller 41 returns to step S30 and performs the determination in step S30 until hydrogen is detected. Controller 41 does not move the position of lid 14 unless hydrogen is detected, for example. Note that the case where detection element 22 has not detected hydrogen is, for example, the case where the decrease in the remaining amount of hydrogen is less than or equal to a predetermined amount.

Next, controller 41 calculates the remaining amount of hydrogen based on the detection result of detection element 22 (S50). Controller 41 calculates the remaining amount of hydrogen based on the position of lid 14 when detection element 22 has detected hydrogen. For example, controller 41 may calculate the remaining amount of hydrogen based on a table in which the position of lid 14 and the remaining amount of hydrogen are associated with each other. The remaining amount of hydrogen is an example of the remaining amount of a gas.

Next, controller 41 provides notification of the remaining amount of hydrogen calculated (S60). Controller 41, for example, notifies a user's mobile terminal of the remaining amount of hydrogen via communicator 42. By providing notification of the remaining amount of hydrogen when triggered by detection of hydrogen by detection element 22 (reaction to hydrogen by detection element 22), controller 41 is capable of warning the user and the like that the remaining amount of hydrogen is low. Note that the notification may include, for example, information that prompts filling of the gas tank with hydrogen, or may include information indicating the distance that can be traveled with the remaining amount of hydrogen.

Note that although gas detection system 1 has been described above based on an example in which hydrogen is detected to calculate the remaining amount of hydrogen in gas tank 110, gas detection system 1 may be used for other purposes. Gas detection system 1 may be used as, for example, an anomaly detection system that detects a gas leak outside gas detection system 1.

Figure 5:
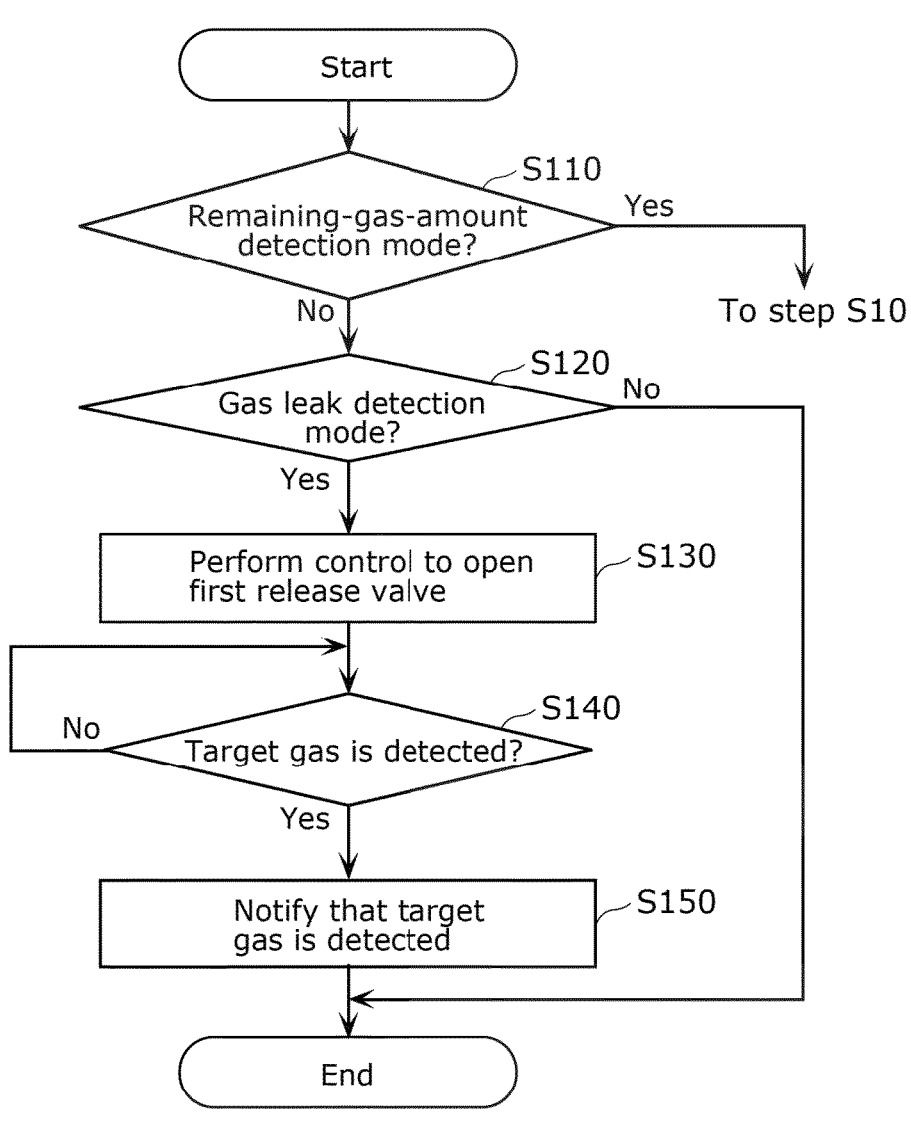
FIG. 5 is a flowchart illustrating another example of operation of the control device according to Embodiment 1.

FIG. 5 is a flowchart illustrating another example of operation of control device 40 according to the present embodiment.

As illustrated in FIG. 5, controller 41 determines whether the current mode is a remaining-gas-amount detection mode (S110). Controller 41 may, for example, determine Yes in step S110 in the case of receiving, via communicator 42, an instruction indicating to operate in the remaining-gas-amount detection mode, and determine No in step S110 in the case of not receiving such an instruction. In the case where schedule information is stored which indicates the time of day for which to operate in the remaining-gas-amount detection mode and the time of day for which to operate in a gas leak detection mode, controller 41 may perform the determination in step S110 based on the schedule information and the current time.

Next, when the current mode is the remaining-gas-amount detection mode (Yes in S110), controller 41 proceeds to step S10 illustrated in FIG. 4 and performs processing from step S10 onward. When the current mode is not the remaining-gas-amount detection mode (No in S110), controller 41 further determines whether the current mode is the gas leak detection mode (S120). Controller 41 may, for example, determine Yes in step S120 in the case of receiving, via communicator 42, an instruction indicating to operate in the gas leak detection mode, and determine No in step S120 in the case of not receiving such an instruction. In the case where the schedule information is stored which indicates the time of day for which to operate in the remaining-gas-amount detection mode and the time of day for which to operate in the gas leak detection mode, controller 41 may perform the determination in step S120 based on the schedule information and the current time.

Next, controller 41 proceeds to step S130 when the current mode is the gas leak detection mode (Yes in S120), and ends the processing when the current mode is not the gas leak detection mode (No in S120).

Next, controller 41 controls first release valve 23 and second release valve 24 so that only first release valve 23 is opened among first release valve 23 and second release valve 24 (S130). This allows gas in the external space outside gas detection system 1 to flow into gas detector 20.

Next, controller 41 determines whether a target gas has been detected in the gas that had flowed in from the external space (S140). Controller 41 performs the determination in step S140 based on whether detection element 22 has detected the target gas. The target gas is set in advance and is hydrogen in the present embodiment. With this, when hydrogen is leaking from gas tank 110, the piping, fuel cell 150, etc., gas detection system 1 can detect that leak of hydrogen.

Next, in the case where the target gas has been detected (Yes in S140), controller 41 notifies that the target gas has been detected (that a gas leak is occurring) (S150). Controller 41, for example, notifies the user's mobile terminal via communicator 42 that the target gas has been detected. Note that the notification may include information indicating, for example, the type of the gas detected, the concentration of the gas detected, and the time at which the target gas was detected. In the case where the target gas is not detected (No in S140), controller 41 returns to step S140 to continue with the detection of the target gas. Controller 41 may continue with the detection of the target gas for a predetermined period of time, for example.

As described above, controller 41 may have two control modes, namely the remaining-gas-amount detection mode and the gas leak detection mode, and the control modes may be switched according to, for example, remote operation from the outside. In the gas leak detection mode, controller 41 opens first release valve 23 to allow the gas in the external space to flow into gas detector 20, and causes detection element 22 to detect whether the target gas is included in the gas that has flowed into gas detector 20. In the remaining-gas-amount detection mode, controller 41 opens at least second release valve 24 to allow hydrogen that has been detected by detection element 22 to flow into fuel cell 150.

[1-4. Advantageous Effects Etc.]

As described above, gas detection system 1 according to the present embodiment is a gas detection system for detecting the remaining amount of hydrogen (an example of the remaining amount of gas) in gas tank 110 that stores hydrogen (an example of the predetermined gas), and gas detection system 1 includes: gas detector 20 that detects hydrogen; and pressure detector 10 (an example of the shutter) that is connected between gas tank 110 and gas detector 20 and opens and closes a path of hydrogen from gas tank 110 to gas detector 20.

Accordingly, gas detection system 1 directly detects hydrogen using gas detector 20 without use of a pressure sensor, and therefore, unlike the case of using a pressure sensor, accurate detection of the remaining amount of gas is possible even when the remaining amount of gas is less than or equal to a certain value. In other words, since gas detection system 1 directly detects hydrogen using gas detector 20, it is possible to precisely detect the remaining amount of gas even when the remaining amount of gas is low. It is therefore possible to implement gas detection system 1 capable of detecting the remaining amount of gas more accurately than the conventional technique.

Pressure detector 10 includes pressure detection valve 13 that opens when the pressure of hydrogen is less than or equal to a predetermined pressure, and gas detector 20 detects whether or not hydrogen is present.

Accordingly, gas detection system 1 has a configuration in which detection element 22 detects hydrogen when the pressure of hydrogen is less than or equal to the predetermined pressure. That is to say, gas detection system 1 is capable of detecting a drop in the remaining amount of gas in gas tank 110. Since there is a correlation between the pressure of hydrogen and the remaining amount of hydrogen, the remaining amount of hydrogen in gas tank 110 can be detected through detection of hydrogen by detection element 22.

Communication hole 13a for allowing communication between gas tank 110 and gas detector 20 is provided in pressure detection valve 13. Gas detection system 1 further includes adjustment device 50 (an example of the adjuster) that adjusts the position of lid 14 that closes communication hole 13a. When gas detector 20 detects hydrogen, adjustment device 50 moves lid 14 toward pressure detection valve 13 to close communication hole 13a.

Accordingly, gas detection system 1 is capable of detecting the remaining amount of gas in a plurality of levels according to reduction in the remaining amount of gas in gas tank 110.

Pressure detector 10 further includes: partition film 12 that blocks the path of hydrogen and includes opening 12*a* in which pressure detection valve 13 is provided; housing 11 that houses partition film 12 and pressure detection valve 13 and allows the pressure of hydrogen to act on partition film 12; and lid 14 that closes communication hole 13*a* from an end of communication hole 13*a* closer to gas detector 20 than to gas tank 110.

Accordingly, it is possible to implement pressure detector 10 in which pressure detection valve 13 and lid 14 can automatically open in response to a drop in the pressure of hydrogen.

Gas detection system 1 further includes: depressurization valve 30 that is disposed in the path, at a position between pressure detector 10 and gas detector 20, and depressurizes hydrogen flowing from pressure detector 10 into gas detector 20.

Accordingly, it is possible to inhibit a breakdown of detection element 22 included in gas detector 20 due to the pressure of hydrogen.

Gas detector 20 includes: one or more release valves (e.g., at least one of first release valve 23 or second release valve 24) for releasing hydrogen from pressure detector 10 to the outside of gas detector 20; and controller 41 that controls opening and closing of the one or more release valves.

Accordingly, hydrogen in gas detector 20 can be released to the outside of gas detector 20 by controller 41 controlling the opening and closing of the one or more release valves, and therefore, gas detection system 1 is capable of detecting the remaining amount of hydrogen in a plurality of levels.

The one or more release valves include: first release valve 23 that opens and closes a path between internal space 20*a* of gas detector 20 and the external space outside gas detector 20; and second release valve 24 that opens and closes a path between gas detector 20 and fuel cell 150 to which hydrogen is supplied from gas tank 110. Controller 41 opens at least one of first release valve 23 or second release valve 24 when hydrogen is to be released to the outside of gas detector 20.

Accordingly, hydrogen in gas detector 20 can be released to at least one of the external space or fuel cell 150.

Controller 41 has a gas leak detection mode for detecting a gas leak in the external space and a remaining-gas-amount detection mode for detecting the remaining amount of hydrogen in gas tank 110. In the gas leak detection mode, controller 41 opens first release valve 23 to allow a gas in the external space to flow into gas detector 20, and in the remaining-gas-amount detection mode, controller 41 opens at least second release valve 24 to supply, to fuel cell 150, hydrogen whose concentration has been detected.

Accordingly, controller 41 can detect a gas leak in addition to the remaining amount of gas. Furthermore, since hydrogen that has been detected by detection element 22 flows (is supplied) to fuel cell 150, gas detection system 1 can make effective use of hydrogen that has been detected.

Gas detection system 1 further includes check valve 60 disposed between gas detector 20 and fuel cell 150 to prevent backflow of gas from fuel cell 150 to gas detector 20.

Accordingly, backflow of hydrogen from fuel cell 150 to gas detector 20 can be prevented. For example, it is possible to inhibit false detection by detection element 22 caused by backflow of hydrogen from fuel cell 150 to gas detector 20. Therefore, check valve 60 can further enhance the precision of the hydrogen detection.

Gas detection system 1 further includes communicator 42 (an example of the wireless communicator) that communicates with a device outside a fuel cell vehicle (an example of the mobile body) to which gas detection system 1 is provided.

Accordingly, since the detection result etc. of gas detector 20 can be transmitted to the device outside, the remaining amount of gas of the mobile body can be monitored remotely.

Gas detection system 1 is a battery-operable system.

Accordingly, an external power supply is not required for operating gas detection system 1, and therefore, gas detection system 1 becomes more flexible in terms of the place for installation and thus becomes more versatile. In addition, since the external power supply is not required, the total number of components (cost) can be reduced.

Gas detector 20 detects hydrogen as the predetermined gas.

Accordingly, the remaining amount of hydrogen can be precisely detected, thereby improving the reliability of the detection of the remaining amount of hydrogen in, for example, a mobile body that uses hydrogen as fuel. The improved reliability of the detection of the remaining amount of hydrogen can contribute to the further spread of such mobile bodies.

As described above, the gas detection method according to the present embodiment is a gas detection method to be performed by gas detection system 1 for detecting the remaining amount of hydrogen (an example of the remaining amount of gas) in gas tank 110 that stores hydrogen (an example of the predetermined gas). Gas detection system 1 includes: gas detector 20 that detects whether or not hydrogen is present; and pressure detector 10 that is connected between gas tank 110 and gas detector 20 and includes pressure detection valve 13 that opens and closes a path of hydrogen from gas tank 110 to gas detector 20. The gas detection method includes: causing pressure detection valve 13 to open naturally when the pressure of hydrogen is less than or equal to a predetermined pressure (S20); and detecting, by gas detector 20, hydrogen from pressure detector 10 when pressure detection valve 13 is open (S30).

Accordingly, with the gas detection method, hydrogen is directly detected using gas detector 20 without use of a pressure sensor, and therefore, even when the remaining amount of gas is low, it is possible to calculate the remaining amount of gas more precisely than in the case of using a pressure sensor. In addition, with the gas detection method, pressure detection valve 13 is opened in response to a drop in the pressure of hydrogen, and it is thus possible to detect a decrease in the remaining amount of hydrogen in gas tank 110. Accordingly, it is possible to implement a gas detection method by which the remaining amount of gas can be detected more accurately than the conventional technique.

Embodiment 2

Hereinafter, a gas detection system according to the present embodiment will be described with reference to FIG. 6 through FIG. 8. Note that the following description will focus on the differences from Embodiment 1, and description of the points identical or similar to those in Embodiment 1 will be omitted or simplified.

[2-1. Configuration of Gas Detection System]

First, a configuration of the gas detection system according to the present embodiment will be described with reference to FIG. 6. FIG. 6 is a partial cross-sectional view schematically illustrating a configuration of gas detection system 1a according to the present embodiment. FIG. 6 illustrates a schematic cross-sectional view of gas collector 210 when the path (flow path) of hydrogen is opening or closing. FIG. 6 illustrates a cross-sectional view of lid 14, housings 21 and 211, and gas collection valve 213.

Gas detection system 1a according to the present embodiment differs from gas detection system 1 of Embodiment 1 in that gas detection system 1a includes gas collector 210 instead of pressure detector 10. Gas detection system 1a is configured to detect the remaining amount of gas sequentially (e.g., at timing that is set in advance). Gas detection system 1a samples hydrogen to detect the concentration of the hydrogen.

Figure 6:
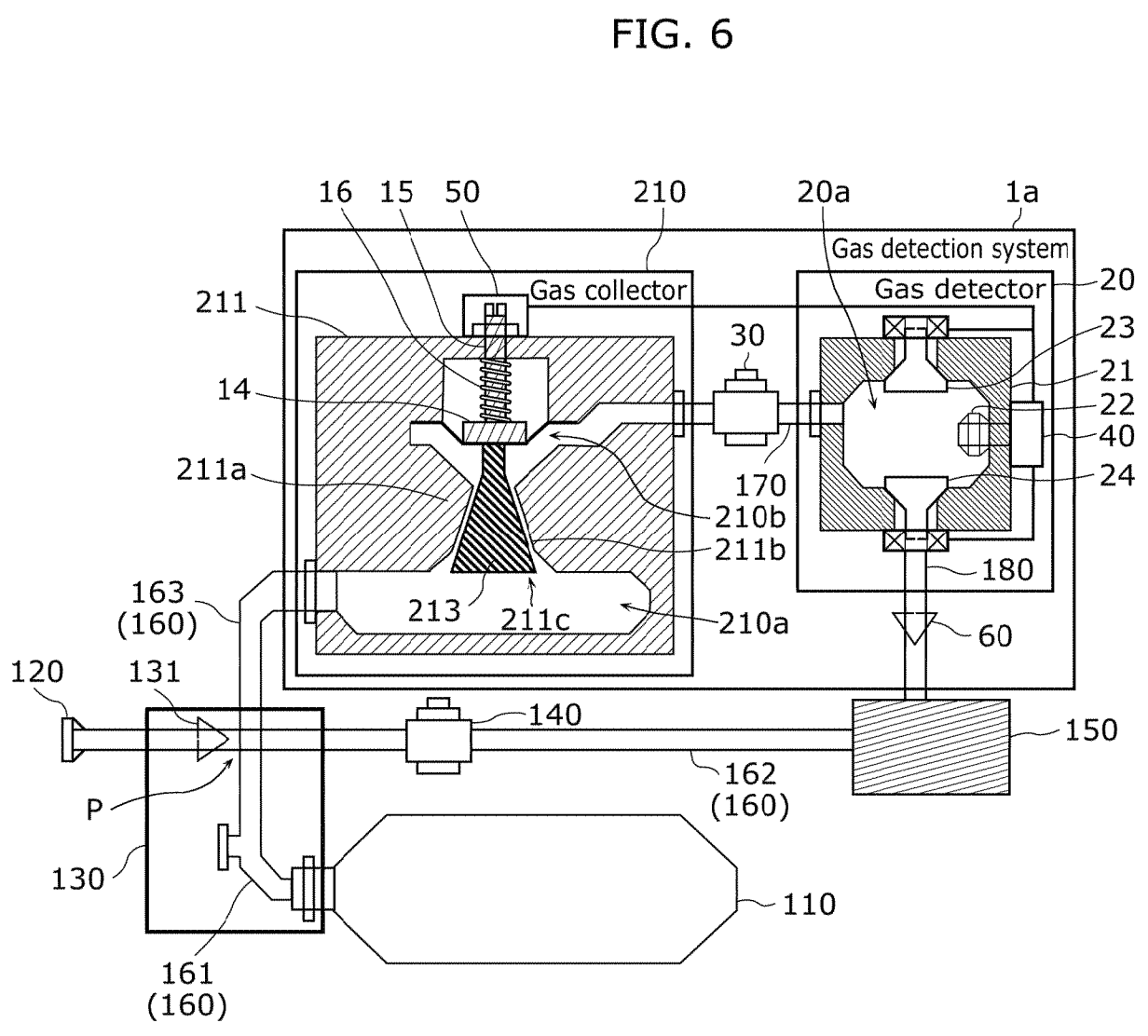

As illustrated in FIG. 6, gas detection system 1a includes gas collector 210, gas detector 20, depressurization valve 30, control device 40, adjustment device 50, and check valve 60.

Gas collector 210, which is an example of the shutter, opens and closes a path at predetermined time intervals according to the control by adjustment device 50, thereby allowing hydrogen of an amount corresponding to the remaining amount of hydrogen in gas tank 110 to flow into gas detector 20 at each predetermined time interval. Gas collector 210 includes housing 211, gas collection valve 213, lid 14, rod 15, and spring 16. Note that the path in the present embodiment is formed by first piping portion 161, third piping portion 163, first internal space 210a, communication hole 211c, second internal space 210b, and piping 170.

Housing 211 is a case that houses therein gas collection valve 213, lid 14, rod 15, and spring 16. Housing 211 is sealed in a state in which third piping portion 163 forming a part of the path of hydrogen from gas tank 110 and piping 170 connecting gas collector 210 and gas detector 20 are connected.

Housing 211 has engagement portion 211a to be engaged with gas collection valve 213. When gas collection valve 213 and engagement portion 211a are engaged, communication between first internal space 210a and second internal space 210b is blocked. That is to say, when gas collection valve 213 and engagement portion 211a are engaged, the path (flow path) of hydrogen between gas tank 110 and gas detector 20 is closed.

Engagement portion 211a has sloping surface 211b that slopes (e.g., tapers) so that the radius decreases as engagement portion 211a approaches to lid 14. Communication hole 211c that penetrates in the up-down direction is provided in engagement portion 211a. The diameter of communication hole 211c decreases with a decrease in distance to lid 14. Communication hole 211c is a truncated-cone-shaped through-hole that allows communication between first internal space 210a and second internal space 210b.

Gas collection valve 213, which is an example of the open-close valve, is inserted through communication hole 211c. The shape of gas collection valve 213 corresponds to sloping surface 211b of engagement portion 211a. Gas collection valve 213 is tapered toward lid 14.

Gas collection valve 213 is fixed to lid 14 and moves with lid 14 in the up-down direction at predetermined time intervals according to the control by adjustment device 50 to open and close the path.

Note that the position of gas collection valve 213 for closing the path is an example of a first position. The first position is the position of gas collection valve 213 at which sloping surface 211b and gas collection valve 213 are in contact with each other and there is no gap between sloping surface 211b and gas collection valve 213. The position of gas collection valve 213 for opening the path (see FIG. 7A and FIG. 7B, for example) is an example of a second position. The second position is the position at which sloping surface 211b and gas collection valve 213 are not in contact with each other and predetermined gap 210c is formed between sloping surface 211b and gas collection valve 213 (see, for example, FIG. 7A and FIG. 7B).

Housing 211 is formed using a material that can withstand the pressure of hydrogen. Housing 211 is formed using metal, for example, but is not limited to this.

In the present embodiment, detection element 22 is capable of detecting the concentration of hydrogen.

Adjustment device 50 opens and closes gas collection valve 213 at predetermined time intervals to take hydrogen for hydrogen concentration detection from first internal space 210a into second internal space 210b. Adjustment device 50 instantaneously opens gas collection valve 213 at predetermined time intervals, for example. The time period of the instantaneous opening is set in advance, e.g., about 0.1 seconds, but is not limited to this. The predetermined time interval is constant regardless of, for example, the remaining amount of hydrogen (the pressure of hydrogen). The predetermined time interval is also constant regardless of, for example, the time that has elapsed since the start of hydrogen concentration detection.

Adjustment device 50 may electromagnetically move gas collection valve 213 to open gas collection valve 213. Adjustment device 50 may include a coil, a yoke, a fixed iron core, etc., and rod 15 may be formed using a magnetic material. By moving rod 15 with electromagnetic force generated by electric current passed through the coil, gas collection valve 213 may be moved to be in the open state. Adjustment device 50, rod 15, and gas collection valve 213 may constitute what is known as a solenoid valve.

Gas collection valve 213 may be closed by, in addition to the pressure of hydrogen, the elastic force of spring 16, for example. Adjusting device 50 and spring 16 are an example of the movement member (a movement mechanism) that moves gas collection valve 213 between the first position at which gas collection valve 213 is closed and the second position at which gas collection valve 213 is opened. Note that the method of opening and closing gas collection valve 213 is not particularly limited.

Spring 16 acts to assist the operation of gas collection valve 213 closing the path using the pressure of hydrogen.

[2-2. Operation of Gas Detection System]

Figures 7A, 7B:
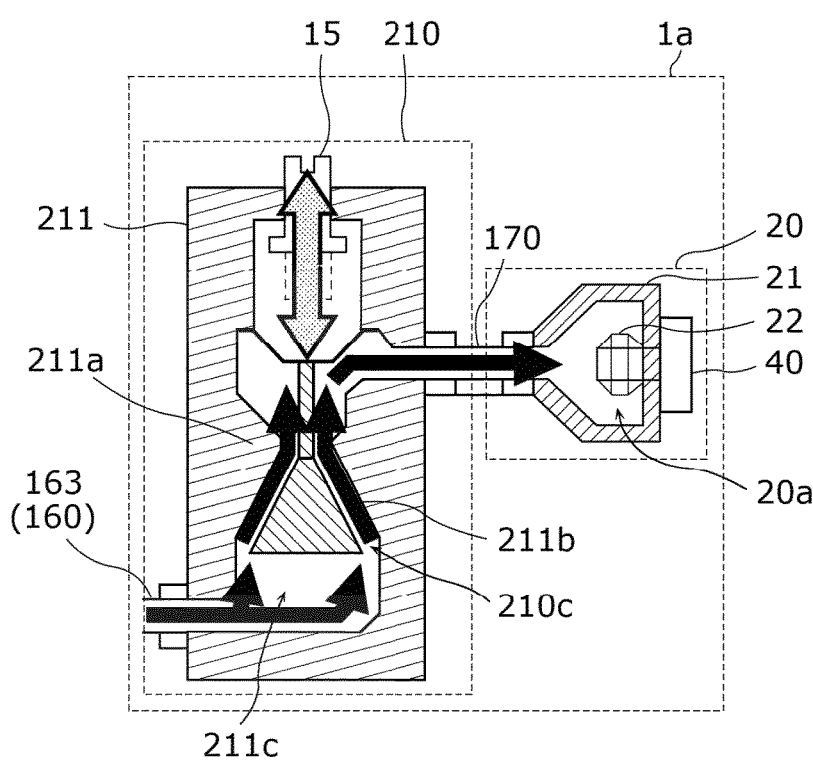
FIG. 7A is a diagram for describing detection of a gas concentration when there is a sufficient amount of gas remaining in a gas tank according to Embodiment 2.
FIG. 7B is a diagram for describing detection of a gas concentration when there is a slight amount of gas remaining in the gas tank according to Embodiment 2.

Next, operation of gas detection system 1a (collection of hydrogen) will be described with reference to FIG. 7A and FIG. 7B. FIG. 7A is a diagram for describing detection of a gas concentration when there is a sufficient amount of gas remaining in gas tank 110. FIG. 7B is a diagram for describing detection of a gas concentration when there is a slight amount of gas remaining in gas tank 110. The arrows in FIG. 7A and FIG. 7B show the inflow paths of hydrogen. The thickness of the arrows represents the amount of hydrogen inflow; the thicker the arrow, the larger the amount of hydrogen inflow. A large amount of hydrogen inflow is equivalent to a high pressure of hydrogen. Note that FIG. 7A and FIG. 7B only illustrate constituent elements used for describing operation of gas detection system 1a, and omit illustration of some constituent elements (e.g., depressurization valve 30).

FIG. 7A illustrates how gas detection system 1a collects hydrogen (gas collection valve 213 in the open state) when there is a sufficient amount of hydrogen remaining in gas tank 110 and the internal pressure of gas tank 110 is high. In this case, since the pressure of hydrogen is high, a large amount of hydrogen flows into gas detector 20 from first internal space 210a via gap 210c between sloping surface 211b and gas collection valve 213. As a result, the hydrogen concentration in gas detector 20 becomes high and thus the result of the hydrogen concentration detection performed by detection element 22 becomes a high value.

FIG. 7B illustrates how gas detection system 1a collects hydrogen (gas collection valve 213 in the open state) when there is a slight amount of hydrogen remaining in gas tank 110 and the internal pressure of gas tank 110 is low. In this case, since the pressure of hydrogen is low, a small amount of hydrogen flows into gas detector 20 from first internal space 210a via gap 210c between sloping surface 211b and gas collection valve 213. As a result, the hydrogen concentration in gas detector 20 becomes low and thus the result of the hydrogen concentration detection performed by detection element 22 becomes a low value.

In such a manner as described, in the present embodiment, the hydrogen concentration is detected by utilizing the fact that the amount of inflow of hydrogen flowing into gas detector 20 varies according to the internal pressure of gas tank 110 (the pressure of hydrogen).

Note that the case of FIG. 7A and the case of FIG. 7B are the same in terms of the position of gas collection valve 213, the time period for which gas collection valve 213 is open, and the size of gap 210c between gas collection valve 213 and sloping surface 211b. Also, the second position of gas collection valve 213 illustrated in FIG. 7A and the second position of gas collection valve 213 illustrated in FIG. 7B are the same. That is to say, the second position is the same regardless of the remaining amount of hydrogen (the pressure of hydrogen).

[2-3. Operation of Control Device]

Next, operation of control device 40 will be described with reference to FIG. 8. FIG. 8 is a flowchart illustrating operation of control device 40 (a gas detection method) according to the present embodiment.

Figure 8:
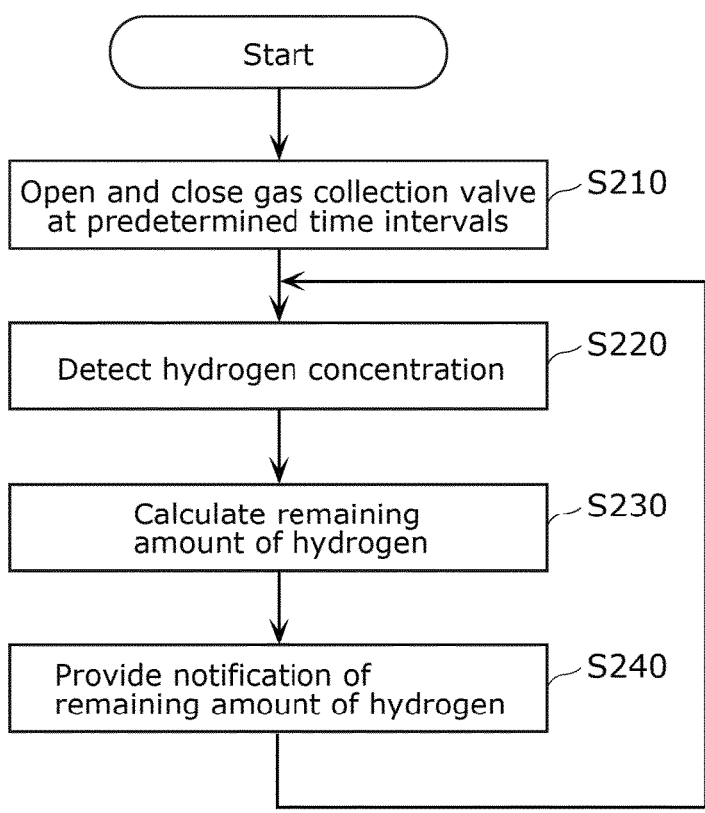
FIG. 8 is a flowchart illustrating operation of a control device according to Embodiment 2.

As illustrated in FIG. 8, controller 41 of control device 40 opens and closes gas collection valve 213 at predetermined time intervals (S210). For example, controller 41 causes adjustment device 50 to move gas collection valve 213 in the up-down direction at predetermined time intervals.

Next, detection element 22 detects the concentration of hydrogen (hydrogen concentration) flowing into gas detector 20 (S220). After detection element 22 detects the concentration of hydrogen, controller 41 may release at least second release valve 24 to feed hydrogen into fuel cell 150.

Next, controller 41 calculates the remaining amount of hydrogen in gas tank 110 (the remaining amount of hydrogen) based on the hydrogen concentration detected by detection element 22 (S230). For example, controller 41 may calculate the currently remaining amount of hydrogen based on the hydrogen concentration detected by detection element 22 and a table that shows a relationship between the hydrogen concentration and the remaining amount of hydrogen.

Next, controller 41 provides notification of the remaining amount of hydrogen calculated (S240). For example, controller 41 notifies a user's mobile terminal of the remaining amount of hydrogen via communicator 42. Note that the notification may include, for example, information that prompts the user to fill the gas tank with hydrogen, or may include information indicating the distance that can be traveled with the remaining amount of hydrogen.

[2-4. Advantageous Effects Etc.]

As described above, gas collector 210 (an example of the shutter) of gas detection system 1a according to the present embodiment includes gas collection valve 213 (an example of the open-close valve) that opens and closes the path at predetermined time intervals, and gas detector 20 detects the concentration of hydrogen (an example of the predetermined gas).

Accordingly, gas detection system 1a directly detects the hydrogen concentration using gas detector 20 without use of a pressure sensor, and therefore, unlike the case of using a pressure sensor, the detection precision is unlikely to vary according to the remaining amount of hydrogen. In other words, since gas detection system 1a directly detects the hydrogen concentration using gas detector 20, it is possible to precisely detect the remaining amount of hydrogen even when the remaining amount of gas is low. It is therefore possible to implement gas detection system 1a capable of detecting the remaining amount of gas more accurately than the conventional technique.

Gas collector 210 further includes: a movement member (e.g., spring 16 and adjustment device 50) that opens and closes the path at the predetermined time intervals by moving gas collection valve 213; and housing 211 that houses gas collection valve 213.

Accordingly, the movement member causes gas collection valve 213 to open and close at predetermined time intervals, and it is therefore possible to allow hydrogen to flow into gas detector 20 in an amount of inflow corresponding to the internal pressure of gas tank 110.

As described above, the gas detection method according to the present embodiment is a gas detection method to be performed by gas detection system 1a for detecting the remaining amount of hydrogen (an example of the remaining amount of gas) in gas tank 110 that stores hydrogen (an example of the predetermined gas). Gas detection system 1a includes: gas detector 20 that detects a concentration of hydrogen; and gas collector 210 (an example of the shutter) that is connected between gas tank 110 and gas detector 20 and includes gas collection valve 213 (an example of the open-close valve) that opens and closes a path of hydrogen from gas tank 110 to gas detector 20. The gas detection method includes: opening and closing the path at predetermined time intervals using gas collection valve 213 (S210); and detecting, by gas detector 20, a concentration of hydrogen from gas collector 210 when gas collection valve 213 is open (S220).

Accordingly, with the gas detection method, the hydrogen concentration is directly detected using gas detector 20 without use of a pressure sensor, and therefore, even when the remaining amount of gas is low, it is possible to calculate the remaining amount of gas more precisely than in the case of using a pressure sensor. In addition, with the gas detection method, it is possible to directly detect the hydrogen concentration by utilizing the fact that the amount of inflow of hydrogen flowing into gas detector 20 varies according to the remaining amount of hydrogen (according to the internal pressure of gas tank 110). Accordingly, it is possible to implement a gas detection method for calculating the remaining amount of gas more accurately than the conventional technique.

Application Examples

Figure 9:
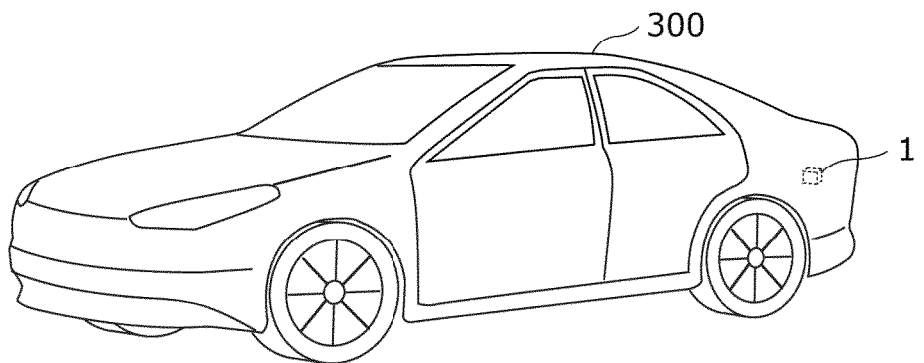
FIG. 9 is a first diagram illustrating an application example of the gas detection system according to the present disclosure.
Figure 10:
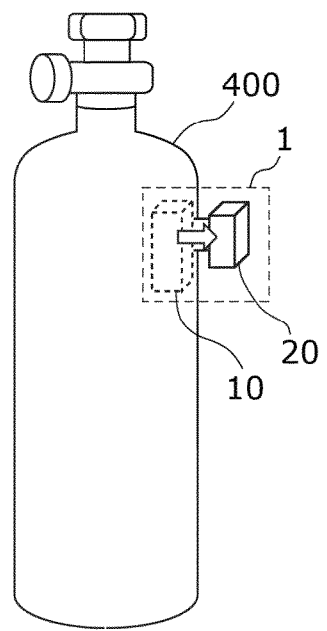
FIG. 10 is a second diagram illustrating an application example of the gas detection system according to the present disclosure.

Application examples of gas detection systems 1 and 1a described in the above embodiments will be described with reference to FIG. 9 and FIG. 10. FIG. 9 is a first diagram illustrating an application example of gas detection system 1 according to the present disclosure. FIG. 10 is a second diagram illustrating an application example of gas detection system 1 according to the present disclosure. Note that although FIG. 9 and FIG. 10 illustrate application examples of gas detection system 1 according to Embodiment 1, the same holds true for gas detection system 1*a* according to Embodiment 2.

As illustrated in FIG. 9, gas detection system 1 may be provided to fuel cell vehicle 300. This enables accurate detection of the remaining amount of hydrogen in fuel cell vehicle 300, and thus gas detection system 1 can contribute to further expanded spread of fuel cell vehicle 300.

As illustrated in FIG. 10, gas detection system 1 may be attached to gas tank 400. Gas detection system 1 may be attached to gas tank 400 in a removable manner or may be attached to gas tank 400 in a non-removable manner. For example, some constituent elements of gas detection system 1 (e.g., housing 21) may be integrally formed with gas tank 400. Pressure detection valve 13 (the open-close valve) of gas detection system 1 may be disposed inside gas tank 400.

Other Embodiments

Hereinbefore, a gas detection system and the like according to one or more aspects has been described based on each of the exemplary embodiments above, but the present disclosure is not limited to such embodiments. Various modifications of the embodiments as well as embodiments resulting from combinations of constituent elements in different embodiments that may be conceived by those skilled in the art may be included in the present disclosure so long as such modifications and embodiments do not depart from the essence of the present disclosure.

For example, the predetermined gas in the above embodiments may be a gas that is stored in a gas tank and is problematic if it leaks, such as methane gas or propane gas. The gas detection system in the above embodiments is useful also in detecting the remaining amount and a leak of such a gas that is problematic if it leaks.

Embodiment 1 has illustrated an example in which one pressure detection valve and one lid are provided in the pressure detector, but a plurality of pressure detection valves and a plurality of lids may be provided.

Embodiment 2 has illustrated an example in which one gas collection valve is provided in the gas collector, but a plurality of gas collection valves may be provided. In this case, a communication hole is provided to each of the plurality of gas collection valves.

Embodiment 2 has illustrated an example in which the predetermined time interval is constant, but the predetermined time interval is not limited to this and may be changed according to time. For example, the predetermined time interval may be set to gradually increase or decrease. The predetermined time interval may be changed according to the concentration of hydrogen. For example, the predetermined time interval may be set to increase or decrease as the concentration of hydrogen becomes lower.

The above embodiments have illustrated an example in which the shutter and the gas detector are separately provided, but the present disclosure is not limited to this. The gas detector may be provided as a part of the shutter. For example, the detection element may be disposed in the second internal space of the shutter.

Moreover, in the above embodiments, the constituent elements may be configured with dedicated hardware or may be implemented by executing a software program suited to the constituent elements. The constituent elements may be implemented by a program executor such as a central processing unit (CPU) or a processor reading out and executing a software program recorded on a recording medium such as a hard disk or semiconductor memory.

The order of executing the steps in the flowcharts is a mere example for specifically describing the present disclosure, and thus may be an order other than the order described above. Also, one or more of the steps may be executed simultaneously (in parallel) with another step, and one or more of the steps need not be executed.

An aspect of the present disclosure may also be a computer program that causes a computer to execute each of the characteristic steps included in the gas detection method illustrated in any of FIG. 4, FIG. 5, and FIG. 8.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful, for example, for systems that detect the remaining amount of gas such as hydrogen.

The invention claimed is:

1. A gas detection system for detecting a remaining amount of gas in a gas tank that stores a predetermined gas, the gas detection system comprising:
   a gas detector that detects the predetermined gas; and
   a shutter that is connected between the gas tank and the gas detector and opens and closes a path of the predetermined gas from the gas tank to the gas detector,
   wherein the shutter includes an open-close valve that opens when a pressure of the predetermined gas is less than or equal to a predetermined pressure,
   the gas detector detects whether or not the predetermined gas is present,
   a communication hole for allowing communication between the gas tank and the gas detector is provided in the open-close valve,
   the gas detection system further comprises:
   an adjuster that adjusts a position of a lid that closes the communication hole, and
   when the gas detector detects the predetermined gas, the adjuster moves the lid toward the open-close valve to close the communication hole.

2. The gas detection system according to claim 1, wherein the shutter further includes:
   a partition film that blocks the path and includes an opening in which the open-close valve is provided;
   a housing that houses the partition film and the open-close valve and allows the pressure of the predetermined gas to act on the partition film; and
   the lid that closes the communication hole from an end of the communication hole closer to the gas detector than to the gas tank.

3. The gas detection system according to claim 1, wherein the shutter includes an open-close valve that opens and closes the path at predetermined time intervals, and
   the gas detector detects a concentration of the predetermined gas.

4. The gas detection system according to claim 3, wherein the shutter further includes:

a movement member that opens and closes the path at the predetermined time intervals by moving the open-close valve; and a housing that houses the open-close valve.

5. The gas detection system according to claim 1, further comprising:

a depressurization valve that is disposed in the path, at a position between the shutter and the gas detector, and depressurizes the predetermined gas flowing from the shutter into the gas detector.

6. The gas detection system according to claim 1, wherein the gas detector includes:

one or more release valves for releasing the predetermined gas from the shutter to an outside of the gas detector; and a controller that controls opening and closing of the one or more release valves.

7. The gas detection system according to claim 1, further comprising:

a wireless communicator that communicates with a device outside a mobile body to which the gas detection system is provided.

8. The gas detection system according to claim 1, wherein the gas detection system is a battery-operable system.

9. The gas detection system according to claim 1, wherein the gas detector detects hydrogen as the predetermined gas.

10. A gas detection system for detecting a remaining amount of gas in a gas tank that stores a predetermined gas, the gas detection system comprising:

a gas detector that detects the predetermined gas; and a shutter that is connected between the gas tank and the gas detector and opens and closes a path of the predetermined gas from the gas tank to the gas detector, wherein the gas detector includes:

one or more release valves for releasing the predetermined gas from the shutter to an outside of the gas detector; and a controller that controls opening and closing of the one or more release valves, the one or more release valves include:

a first release valve that opens and closes a path between an internal space of the gas detector and an external space outside the gas detector; and a second release valve that opens and closes a path between the gas detector and a fuel cell to which the predetermined gas is supplied from the gas tank, and the controller opens at least one of the first release valve or the second release valve when the predetermined gas is to be released to the outside of the gas detector.

11. The gas detection system according to claim 10, wherein the controller has a gas leak detection mode for detecting a gas leak in the external space and a remaining-gas-amount detection mode for detecting the remaining amount of the predetermined gas in the gas tank, in the gas leak detection mode, the controller opens the first release valve to allow a gas in the external space to flow into the internal space of the gas detector, and in the remaining-gas-amount detection mode, the controller opens at least the second release valve to supply, to the fuel cell, the predetermined gas whose concentration has been detected.

12. The gas detection system according to claim 10, further comprising:

a check valve disposed between the gas detector and the fuel cell to prevent backflow of the predetermined gas from the fuel cell to the gas detector.

* * * * *